(12) United States Patent  
Roopnarine

(10) Patent No.: US 9,112,386 B2
(45) Date of Patent: Aug. 18, 2015

(54) ELECTRIC MOTOR WITH IMPROVED FLUX PATH AND POWER DENSITY

(71) Applicant: Roopnarine, New York, NY (US)

(72) Inventor: Roopnarine, New York, NY (US)

(*) Notice: Subject to any disclaimer, the term of this patent is extended or adjusted under 35 U.S.C. 154(b) by 345 days.

(21) Appl. No.: 13/741,900

(22) Filed: Jan. 15, 2013

(65) Prior Publication Data

US 2014/0197715 A1  Jul. 17, 2014

(51) Int. Cl.
  H02K 1/06 (2006.01)
  H02K 9/02 (2006.01)
  H02K 1/14 (2006.01)
  H02K 19/10 (2006.01)

(52) U.S. Cl.
  CPC .............. *H02K 9/02* (2013.01); *H02K 1/148* (2013.01); *H02K 19/103* (2013.01)

(58) Field of Classification Search
  USPC .......... 310/60 R, 216.058, 216.106–216.114, 310/264, 254.1
  See application file for complete search history.

(56) References Cited

U.S. PATENT DOCUMENTS

| | | | |
|---|---|---|---|
| 3,321,652 A * | 5/1967 | Opel | 310/168 |
| 6,104,115 A * | 8/2000 | Offringa et al. | 310/156.28 |
| 6,462,449 B1 * | 10/2002 | Lucidarme et al. | 310/156.56 |
| 7,061,152 B2 * | 6/2006 | Petro et al. | 310/156.38 |
| 7,294,948 B2 * | 11/2007 | Wasson et al. | 310/156.38 |
| 7,608,967 B2 * | 10/2009 | Durham et al. | 310/178 |
| 7,884,522 B1 * | 2/2011 | Petro et al. | 310/254.1 |
| 2002/0047448 A1 * | 4/2002 | Kawamura | 310/181 |
| 2005/0062352 A1 * | 3/2005 | Kastinger | 310/156.56 |
| 2007/0145850 A1 * | 6/2007 | Hsu | 310/156.56 |
| 2007/0267929 A1 * | 11/2007 | Pulnikov et al. | 310/156.02 |
| 2013/0248612 A1 * | 9/2013 | Ayanji et al. | 239/5 |

* cited by examiner

*Primary Examiner* — Thanh Lam
(74) *Attorney, Agent, or Firm* — Leighton K. Chong

(57) ABSTRACT

An improved configuration for an electric motor has an inner rotor and an outer stator wherein each stator coil is arranged radially outwardly of its respective stator pole and configured to create a magnetic flux path forming a closed magnetic circuit that flows in directions parallel to the longitudinal axis of the motor, rather than circumferentially about the longitudinal axis of the motor. The magnetic flux created by the stator coil is directed from the stator pole, across the air gap to a corresponding rotor pole, and back to the stator pole to form a closed magnetic circuit path. All stator poles are therefore magnetically isolated from each other.

20 Claims, 18 Drawing Sheets

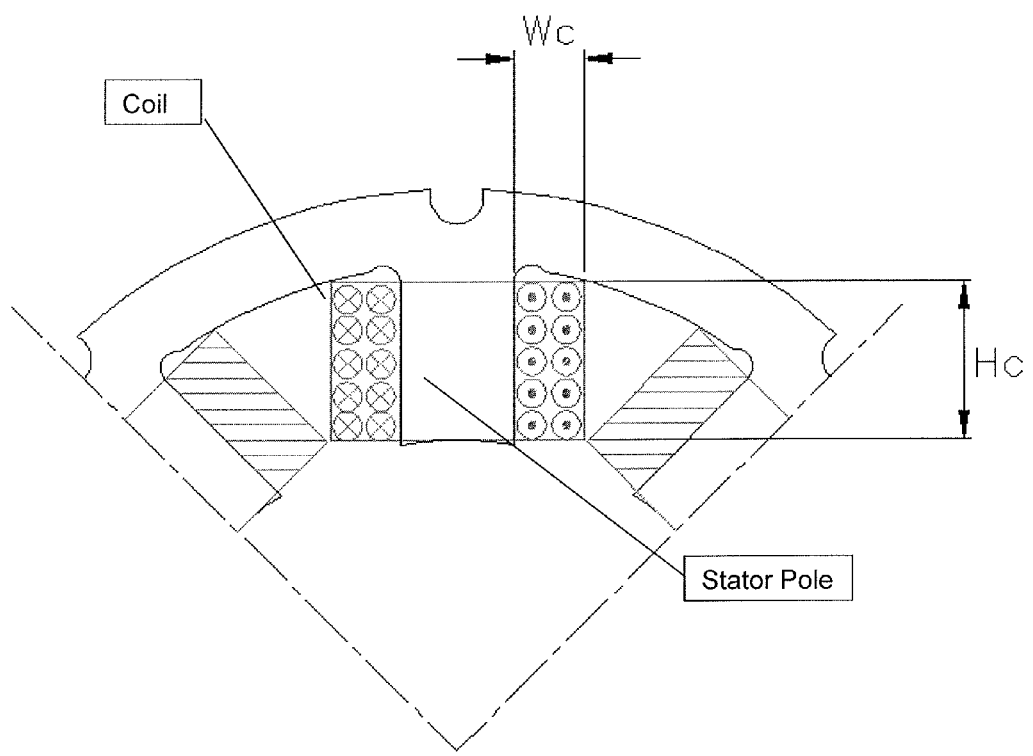
Figure 1(a) -- Prior Art

ELECTRIC MOTOR WITH IMPROVED FLUX PATH AND POWER DENSITY

TECHNICAL FIELD

This invention relates to electric motors and, in particular, an assembly structure to obtain improved performance from electric motors.

BACKGROUND ART

The basic design of electric motors has remained basically the same for some period of time primarily because the electromagnetic circuitry associated with motors has largely remained the same. For salient pole motors, for example, the switched reluctance motor (SRM), the classic design has been that in which the stator windings or the excitation coils are arranged in a circular array with poles protruding inside a hollow stator core where they can interact with similar poles on the rotor. Each stator coil winding is illustrated as having a coil width Wc and a coil height Hc. A closed magnetic circuit in such motors has a flow of magnetic flux from one excited pole to another along the periphery (yoke) of the stator laminations, basically following a circumferential path to the opposing pole through the air gap and rotor.

The typical configuration for a standard SRM motor is illustrated schematically in FIG. 1(a) showing a section of an end view. In the standard configuration, if one looks at the end view of the motor, the right hand rule for flux flow dictates that flux flows in a radial direction. This arrangement has a number of limitations which affect motor performance. The flux path length follows a circular path which is not the shortest path between poles, which means that the reluctance of the machine may be higher than can be optimally obtained. The laminations needed for the stator may also be higher than can be optimally designed, thereby requiring perhaps a higher cost for more material in these laminations, and thereby increasing the overall weight of the motor and lowering its power density.

SUMMARY OF INVENTION

An improved configuration for an electric motor has an inner rotor rotatable on a longitudinal axis of the motor and provided with a circumferential array of rotor poles facing radially outwardly, and an outer stator provided with a circumferential array of stator poles excitable by respective stator coils facing radially inwardly toward corresponding rotor poles separated by a thin radial air gap, wherein each stator coil is arranged radially outwardly of its stator pole and configured to create a magnetic flux path forming a closed magnetic circuit that flows in directions parallel to the longitudinal axis of the motor, rather than circumferentially about the longitudinal axis of the motor. The magnetic flux created by the stator coil is directed from the stator pole, across the air gap to a corresponding rotor pole, and back to the stator pole to form a closed magnetic circuit path. All stator poles are therefore magnetically isolated from each other.

Operationally, the improved electric motor as described behaves exactly the same as the standard design but has several distinct advantages compared to the standard design. The flux path length is less than in the standard design which means that the reluctance of the machine is less. Less laminations are needed for the stator, meaning that a higher quality material could be used for the stator at the same or perhaps lower cost. There is also less material used in manufacturing the laminations. Furthermore, the fact that less material is being used reduces the overall weight of the motor and improves the motor's power density. Also, core losses are reduced because less stator material is used, and there is significantly reduced mutual coupling between coils. With less material for windings, a higher number of turns is achievable so that, for the same stator length, the number of ampere turns (NI) can be much higher. Keeping the NI the same as in a standard design, the stator (and rotor) length can be shortened, resulting in a more compact and lighter motor with a higher power density. The coils can be made more accessible and, in some designs, they could be replaced without removing the motor's end caps. In an open motor design, the coils are essentially exposed and can be better cooled. Acoustic noise can also be practically eliminated. In the improved design, the motor retains a purely radial air gap between the stator and rotor and the forces between these parts are entirely radial or tangential, i.e., there are no thrust force components.

Other objects, features, and advantages of the present invention will be explained in the following detailed description of certain preferred embodiments having reference to the appended drawings.

BRIEF DESCRIPTION OF DRAWINGS

FIG. 8b is a partially assembled view of the configuration shown in FIG. 8a.

FIG. 9b is a partially assembled view of the configuration shown in FIG. 9a.

DESCRIPTION OF PREFERRED EMBODIMENTS

In the following detailed description of the invention, certain preferred embodiments are illustrated providing certain specific details of implementation. However, it will be recognized by one skilled in the art that many other variations and modifications may be made given the disclosed principles of the invention.

Figure 1B:
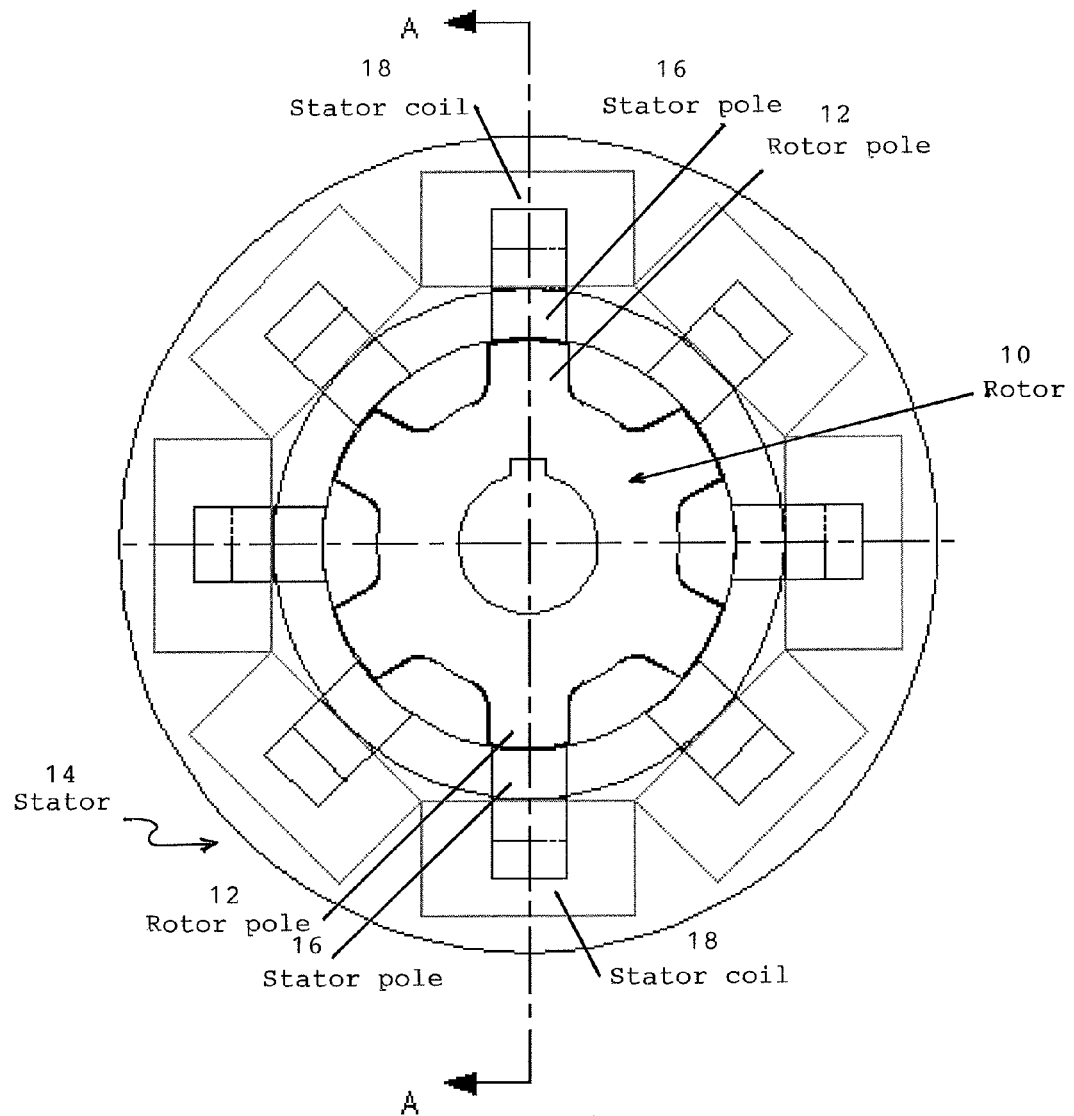
FIG. 1(b) illustrates schematically an end view and FIG. 1(c) a cross-sectional view (along view lines A-A) of an improved configuration for an electric motor in accordance with the present invention.

Referring to the end view shown in FIG. 1(b), an improved configuration for an electric motor in accordance with the present invention has an inner rotor 10 rotatable on a longitudinal axis of the motor and provided with a circumferential array of rotor poles 12 facing radially outwardly, and an outer stator 14 provided with a circumferential array of stator poles 16 formed on stator pole pieces/lamination stack 16a excitable by respective stator coils 18 facing radially inwardly toward the rotor poles 12 separated by a thin radial air gap. Each stator coil 18 is arranged radially outwardly of and wound on the stator pole pieces/lamination stack or stator segment 16a.

Figure 1C:
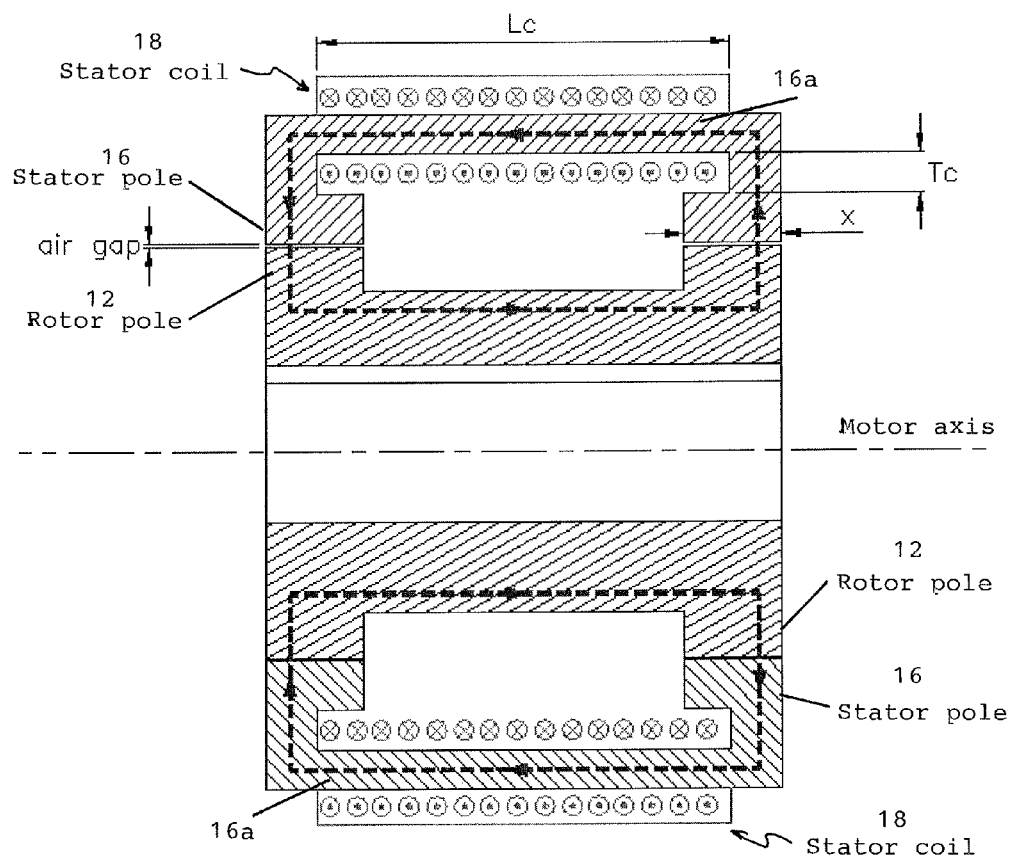
FIG. 1(a) illustrates schematically a section of an end view of a typical configuration for a standard switched reluctance (SRM) motor.

In the cross-sectional view of FIG. 1(c), taken along view lines A-A in FIG. 1(b), the stator poles 16 are shown separated from the rotor poles 12 by a thin radial air gap. Each stator excitation coil 18 is disposed radially outwardly from its respective stator pole 16 (on both ends) and is wound around a stator pole piece/lamination stack 16a in directions transverse to the motor axis (into and out of the plane of the figure) to form an armature. The excitation coil 18 windings when wound around the stator pole piece/lamination stack 16a would have an overall length Lc and a coil thickness Tc. Passing a current in the stator coil windings causes excitation of the corresponding stator pole. As indicated by dashed lines and arrows in the drawing, the magnetic flux flow is directed from the stator pole 16 (on one end), across the radial air gap a first time, through the rotor pole 12, across the radial air gap a second time, and back to the stator pole 16 (on the opposite end) to form a closed magnetic flux path. The magnetic flux path thus flows in a direction parallel to the longitudinal axis of the motor, rather than circumferentially about the longitudinal axis of the motor. All stator poles are therefore magnetically isolated from each other. Distance x denotes the width of a stator pole face which, depending on the rotor configuration used, is matched to the pole face width of the rotor.

Operationally, the improved configuration of the electric motor provides the following distinct advantages:

(a) The flux path length is less than in the standard design which means that the reluctance of the machine is less. With a stator of outer diameter, Ds, a rotor diameter of Dr=Ds/2 (approximately) and a stack length, lstk=Dr, then the approximate difference in flux path lengths, delta, between the standard design and the invention can be shown to be:

$$delta=(pi*Ds/2+Dr)-2*lstk=(pi*Dr+Dr)-2*Dr=2.14*Dr$$

or a reduction of about 50% over the standard design;

(b) Less laminations, therefore, material is needed for the stator. This means that a higher quality soft magnetic alloy (for example, Hiperco™ alloy) could be used for the stator for about the same or perhaps lower cost than electrical or silicon steel. There is also less material used in manufacturing these laminations. Furthermore, the fact that less material is being used reduces the overall weight of the motor and improves the invention's power density.

(c) Core losses are reduced because less stator material is used.

(d) Mutual coupling between coils is significantly reduced.

(e) A higher number of turns is achievable, meaning that, for the same stator length, the number of ampere turns (NI) can be higher. By keeping the NI the same as in a standard design, the stator (and rotor) length can be shortened resulting in a more compact and lighter motor with, therefore, a higher power density. The cross-sectional area Lc×Tc for the coils in the improved configuration of the invention shown in FIG. 1(c) is significantly more than the cross-sectional area Wc×Hc in the typical configuration of the standard motor shown in the end view in FIG. 1(a).

(f) The coils can be made more accessible and in some designs could be replaced without removing the motor's end caps.

(g) In an open motor design, the coils are essentially exposed and can be better cooled.

(h) Acoustic noise, due to ovalization of the stator laminations in the standard design, is practically eliminated in the improved configuration.

(i) With respect to standard axial flux motors, a thrust force component is typically present on the rotor within air gaps that are axial, the present invention retains a purely radial air gap between the stator and rotor, and the forces between these parts are also entirely radial or tangential, that is, there are no thrust force components.

Figure 2:
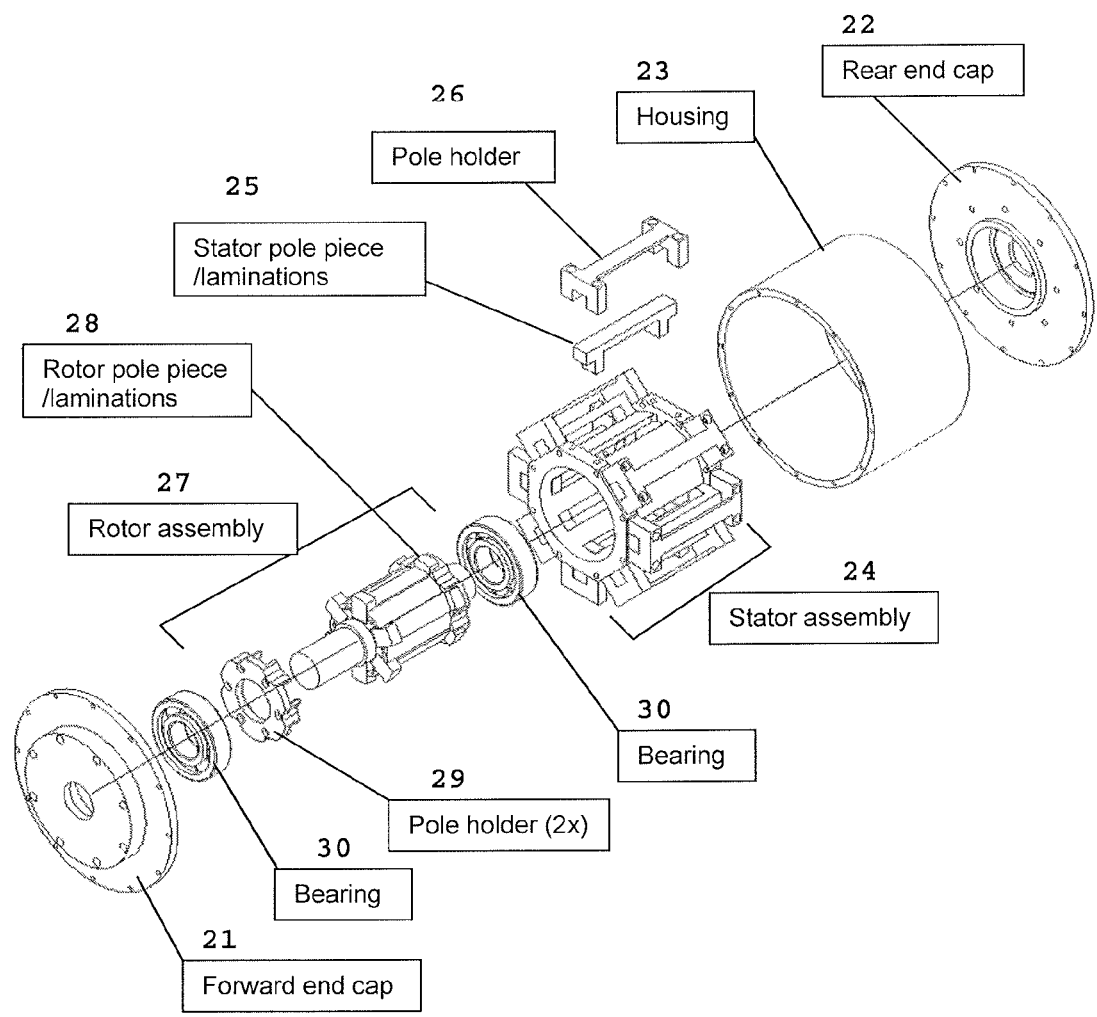
FIG. 2 is an exploded view of one embodiment of an improved configuration for an electric motor.

One preferred embodiment for implementation of the invention is shown in exploded perspective view in FIG. 2. Contained within forward end cap 21, rear end cap 22, and housing 23, is a stator assembly 24, comprised of a circumferential array of stator pole piece laminations 25 held by pole holders 26, and a rotor assembly 27 comprised of a circumferential array of rotor pole piece laminations 28 retained by pole holders 29 and bearings 30. This totally enclosed configuration is most applicable to high horsepower motors, for example, those used on electric vehicles, in which there is a need to cool the motor's windings either by using an internal fan or by a pumped liquid coolant. For lower rated horsepower motors that do not require forced cooling, the housing shown in FIG. 2 may be entirely eliminated thereby exposing the windings. The resulting open-frame configuration enables free convection cooling (or ventilation) and access to the windings themselves which could be potentially replaced or repaired, if damaged, without disassembling the entire motor. There are other advantages to eliminating the housing: it reduces part count and manufacturing cost while increasing the power density of the motor.

Figure 3:
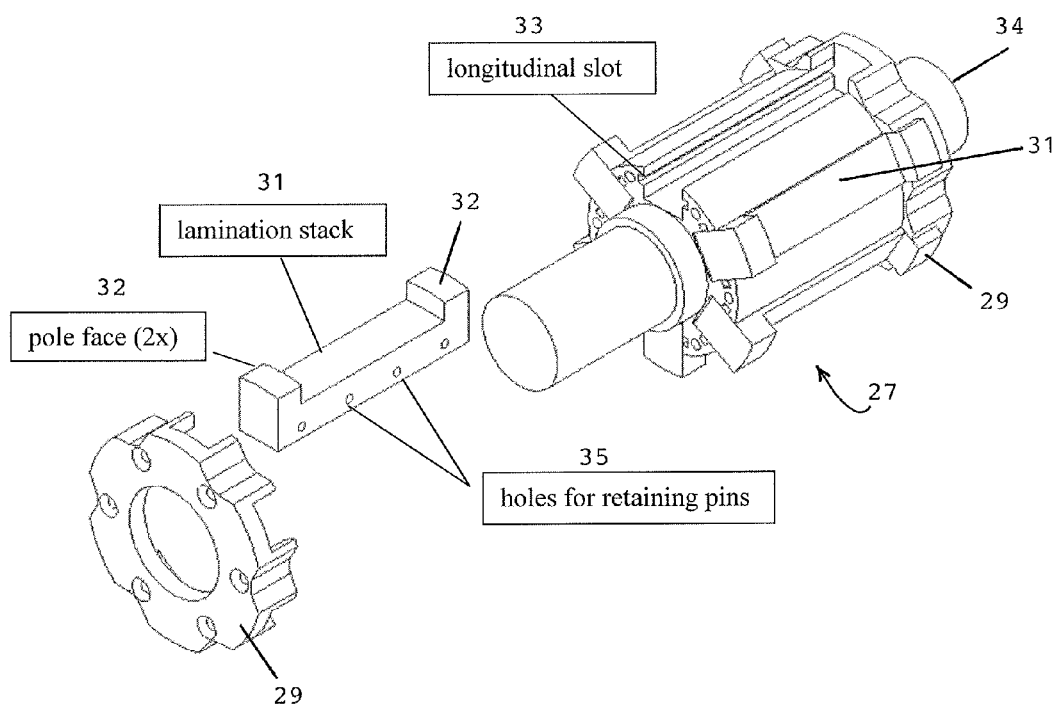
FIG. 3 is an exploded view of a rotor assembly in one embodiment of the improved motor.

Referring to FIG. 3, a preferred rotor assembly 27 has rotor pole pieces each formed by a lamination stack 31 of rotor laminations with pole faces 32 (on the two ends of its length) that is held by pole holders 29 on opposite sides of a longitudinal slot 33 formed in the rotor assembly 27 which together axially constrain the inserted lamination stack 31 and increase its stiffness to torsional or tangential forces. The rotor poles/laminations are stacks that may be comprised of a number of sheets of silicon or electrical steel or any other soft magnetic material joined or mechanically fastened together, preferably welded, to act as one part. These lamination stacks are then attached or fastened to a non-magnetic shaft 34. The attachment scheme shown in FIG. 3 uses a number of retainer pins (not shown in figure) inserted through pin holes 35 in the lamination stack. The retainer pins are engaged in longitudinal slots machined into the non-magnetic shaft. Once the lamination stacks 31 are in place, the pole holders 29 are also attached to the shaft and the assembly is complete.

Other configurations for the rotor assembly are clearly possible and the assembly and means of attachment described above are merely illustrative. One change that can be made, for instance, is one in which the lamination stack is fully rectangular so that the pole faces do not project from this stack. Another possible rotor configuration, for example, is one in which the lamination stack is manufactured as a single block using Somaloy™ alloy offered by Hoganas, A.B., Sweden, and dimensioned to be inserted into open slots on the rotor shaft as shown in FIG. 3.

Figure 4:
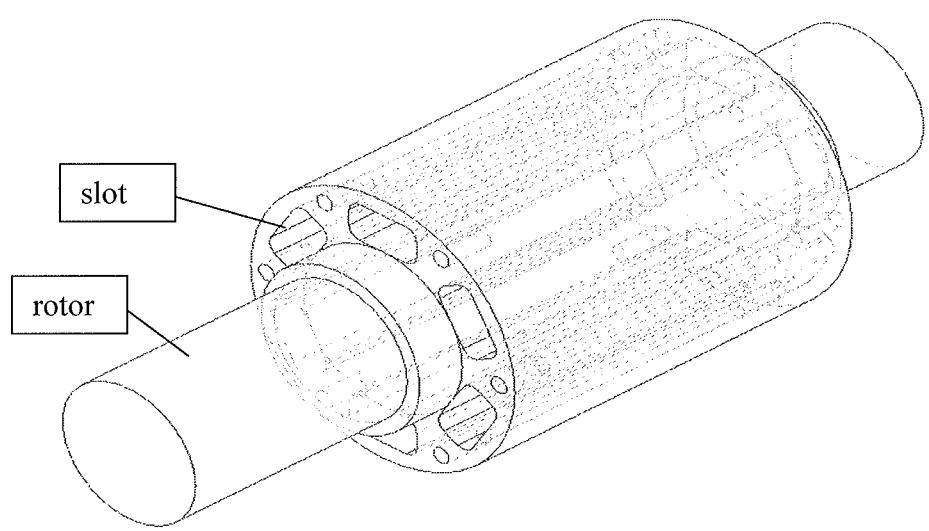
FIG. 4 is an assembled view of a rotor in one embodiment having enclosed slots for insertion of magnetic material.

In an alternate design for a rotor assembly shown in FIG. 4, the rotor housing is formed with enclosed slots for insertion of magnetic material for the pole pieces. From a manufacturing viewpoint, the slots on the rotor could instead be entirely eliminated and be replaced by a cylindrical part manufactured from Somaloy™ alloy. This part will then be keyed to the non-magnetic shaft to allow output motion. Depending on the operational speed of the motor and its power output, it may be desirable to press fit a thin-walled steel sleeve over the Somaloy™ alloy part as a means of providing additional radial constraint against centrifugal forces. Yet another option is to epoxy, onto flats on the non-magnetic rotor shaft, rectangular blocks of Somaloy™ alloy. The number of flats on the shaft will be equal to the number of poles on the rotor. Each of these fastening or attachment methods is well known in the industry, none of them, however, has been known to be used with the stator arrangement disclosed herein.

Figure 5A:
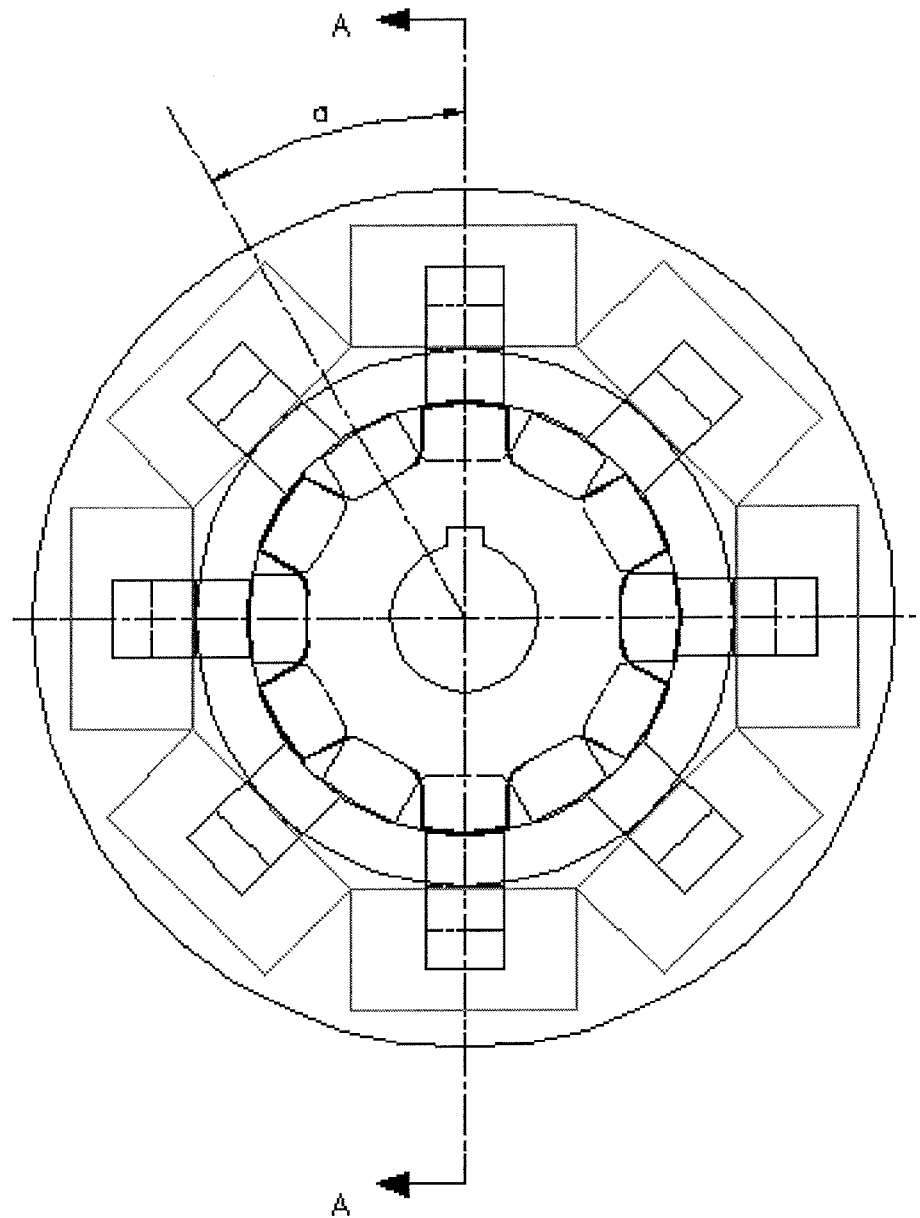
FIG. 5(a) shows an end view of an alternate embodiment of an improved motor having multiple pole sets.
Figure 5B:
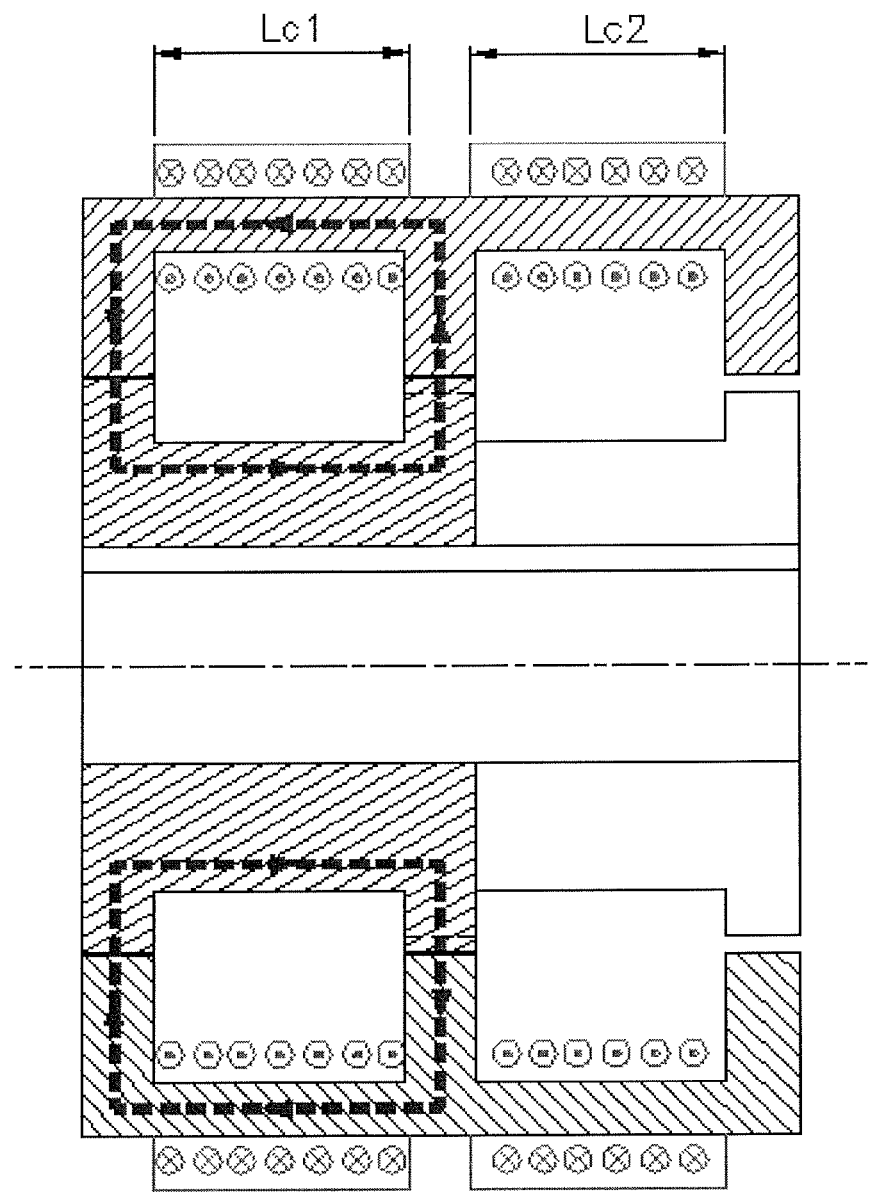
FIG. 5(b) is a cross-sectional view of the alternate embodiment taken along view lines A-A in FIG. 5(a) showing the axial positioning of the multiple pole sets.

FIG. 5(a) shows an end view and FIG. 5(b) shows a cross-sectional view (taken along view lines A-A) of an alternate embodiment of an improved motor having multiple pole sets. Because the number of turns on the motor can be very high, compared to the standard configuration of an SRM, for instance, each stator segment or laminated pole piece can be made with two or more separate windings with lengths Lc1 and Lc2. These coil lengths need not be equal but are preferably so in order to simplify the motor's controller/driver.

FIG. 5(b) illustrates a layout for two coils per stator pole piece/lamination stack or stator segment. The primary reason to have multiple coils and multiple poles on each stator segment is to reduce the torque ripple of the motor. To achieve this, the rotor may be constructed in two distinct sections in which the first half of its length has six poles (Pole Set 1) to react with the eight fixed stator poles; and the second half of the rotor's length also has six poles (Pole Set 2) but they are mechanically offset from the poles of Pole Set 1 by an angle, 'a'. The value of angle 'a' is simply 360 degrees divided by twice the number of rotor poles in the standard design. Therefore, in the schematic shown in FIG. 5(a), the offset angle 'a' between the two rotor pole sets is 360/(6×2)=30 degrees. Any of the means for attaching the rotor poles/lamination stacks to the rotor shaft, described above, can be used to attach the pole sets to the rotor shaft in this configuration. Similarly, the rotor poles in this configuration can be based on any of the various types or geometries described above. It is understood that the controller/driver for a motor constructed according to FIG. 5(a) will need to be somewhat different from one that drives a standard version of the motor and, particularly, with respect to the switching logic of the coils.

Figure 6:
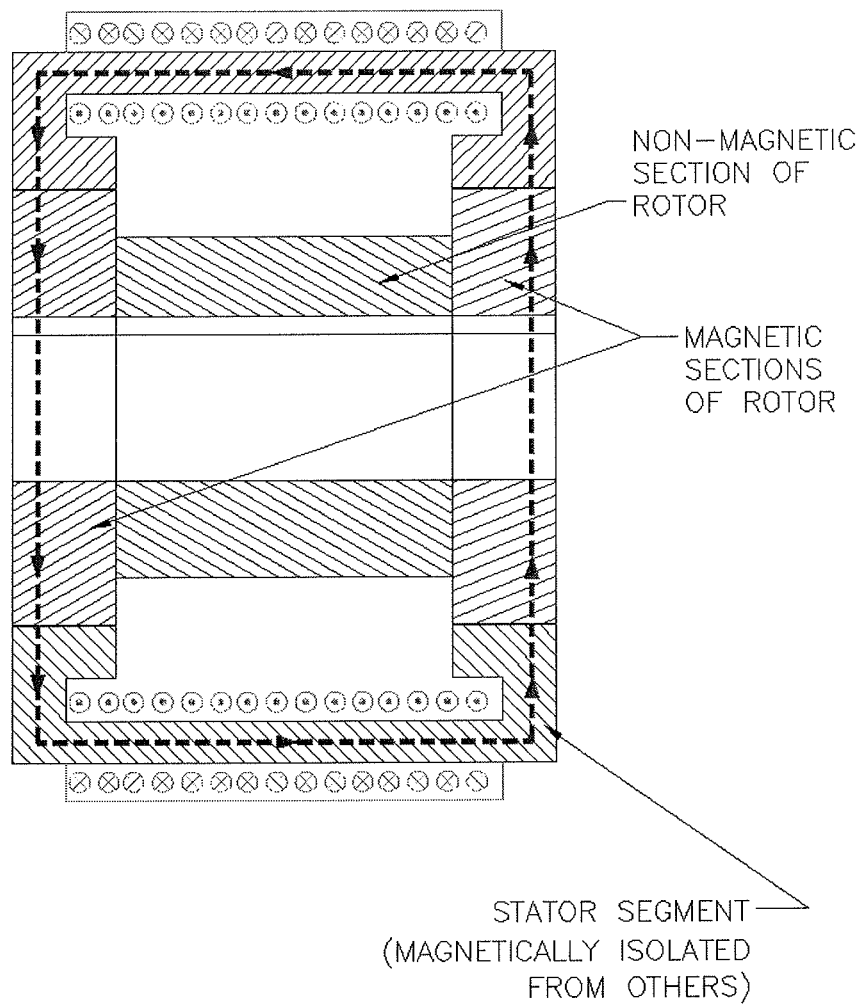
FIG. 6 illustrates another embodiment of an improved motor in which the rotor pole pieces are formed by magnetic and non-magnetic sections.

Yet another configuration of the rotor and flux path is possible. As shown in FIG. 6, this version is one in which the lines of flux flow across the entire diameter of the rotor. In one possible arrangement of this embodiment, the rotor is comprised of three sections; two are magnetic and the third is non-magnetic. The magnetic sections may be made from laminations of sheets of electrical or silicon steel or any other soft magnetic alloy. For this particular configuration, the rotor laminations may have the same shape or design, as shown in the end view of FIG. 1(b), as in the standard motor. It is also possible that the non-magnetic part is simply the shaft in which case the rotor is essentially made of two identical magnetic sections spaced a certain distance apart and keyed to a non-magnetic shaft. In this embodiment, the flux crosses the air gap a total of four times but the coil pairs are energized so as to reinforce each other, that is, the flux from the pair is summed as shown in FIG. 6. Each stator coil segment is magnetically isolated from the others.

An alternative arrangement may combine existing magnetic laminations at each end of the rotor in FIG. 6 with a cylinder of Somaloy™ alloy replacing the non-magnetic section between the two. The flux path will, consequently, be different and more in keeping with the flux path shown in FIG. 1(c). Also possible is the replacement of parts of the non-magnetic section of the rotor shaft, shown in FIG. 6, with Somaloy™ alloy bars attached to the shaft. These bars will be angularly positioned to coincide with the poles of the existing magnetic laminations. The attachment of Somaloy™ alloy bars to the shaft can be accomplished using any of the methods previously described.

Figure 7:
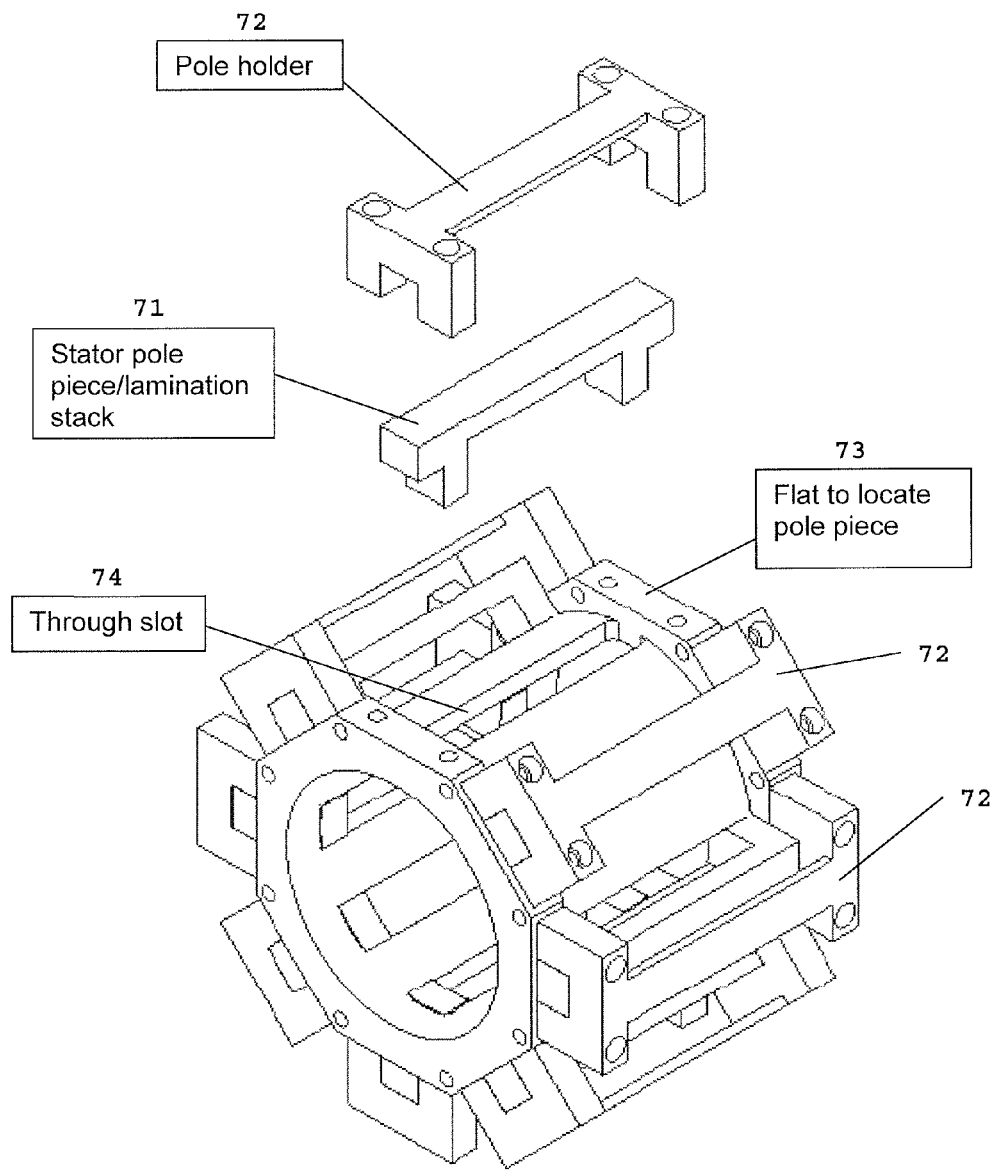
FIG. 7 illustrates another preferred configuration for the stator assembly.

Referring to FIG. 7, a preferred arrangement for the stator assembly may be comprised of a number of stacks 71 (one for each pole) of laminations that may be manufactured from sheets of silicon or electrical steel or any other soft magnetic alloy and joined or mechanically fastened together, preferably welded, to act as one part or stator segment. The motor's excitation coils are wound around these lamination stacks 71, which have integral poles and are then attached or fastened to a non-magnetic stator holder with pole holders 72. The pole holders 72 act to hold and clamp the lamination stacks and excitation coil assembly onto the flat surfaces 73 on the stator holder thereby improving the ability of the poles to react to torsional or tangential forces that drive the rotor. The pole holders 72 are manufactured from a non-magnetic material.

Figure 8A:
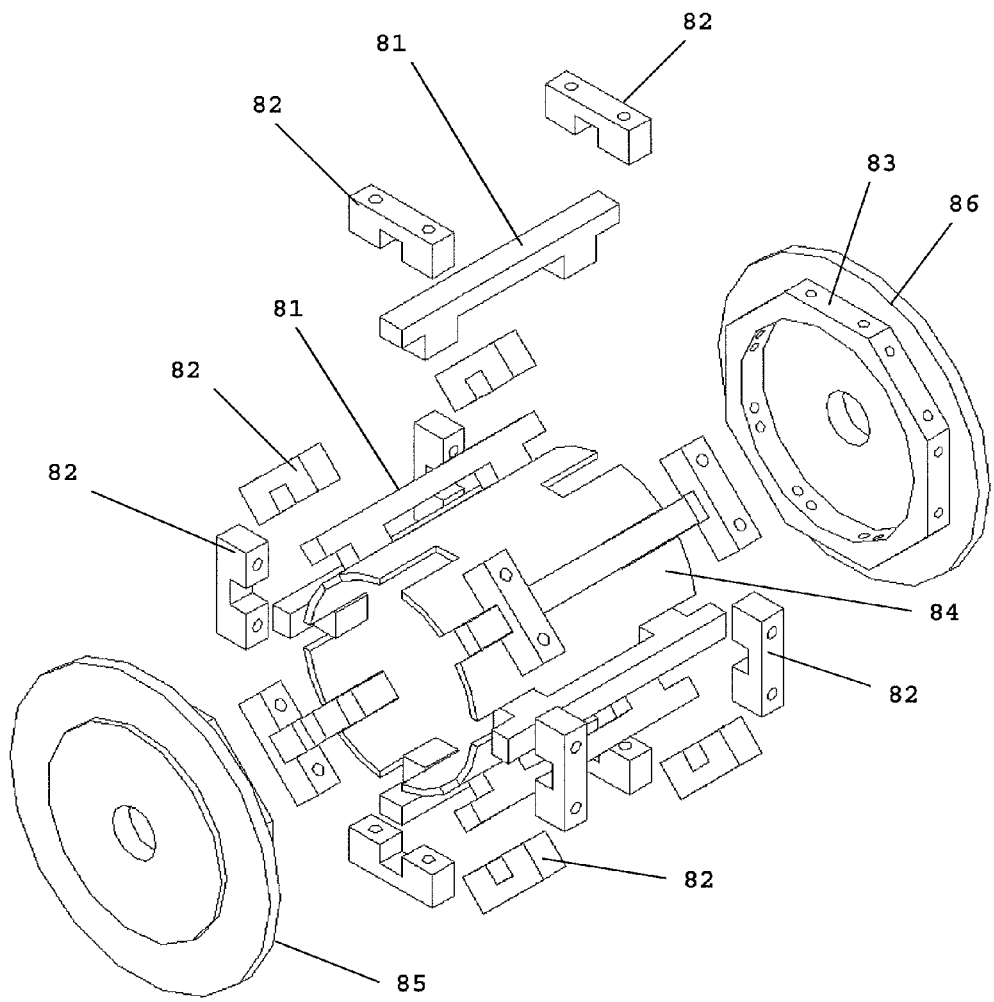
FIG. 8a is an exploded view of another preferred configuration of the stator assembly.

Referring to FIG. 8a, another preferred arrangement of the stator assembly is comprised of a number of lamination stacks 81, each with an excitation coil (not shown) and integral poles, clamped and fastened at each end by pole holders 82 onto the locating flat 83 that is an integral part of forward end cap 85 and rear end cap 86. A thin-walled cylinder 84 may or may not be used to axially locate the end caps 85, 86 and shroud the rotor. The pole holders 82 may be easier to fabricate in this arrangement.

Figure 8B:
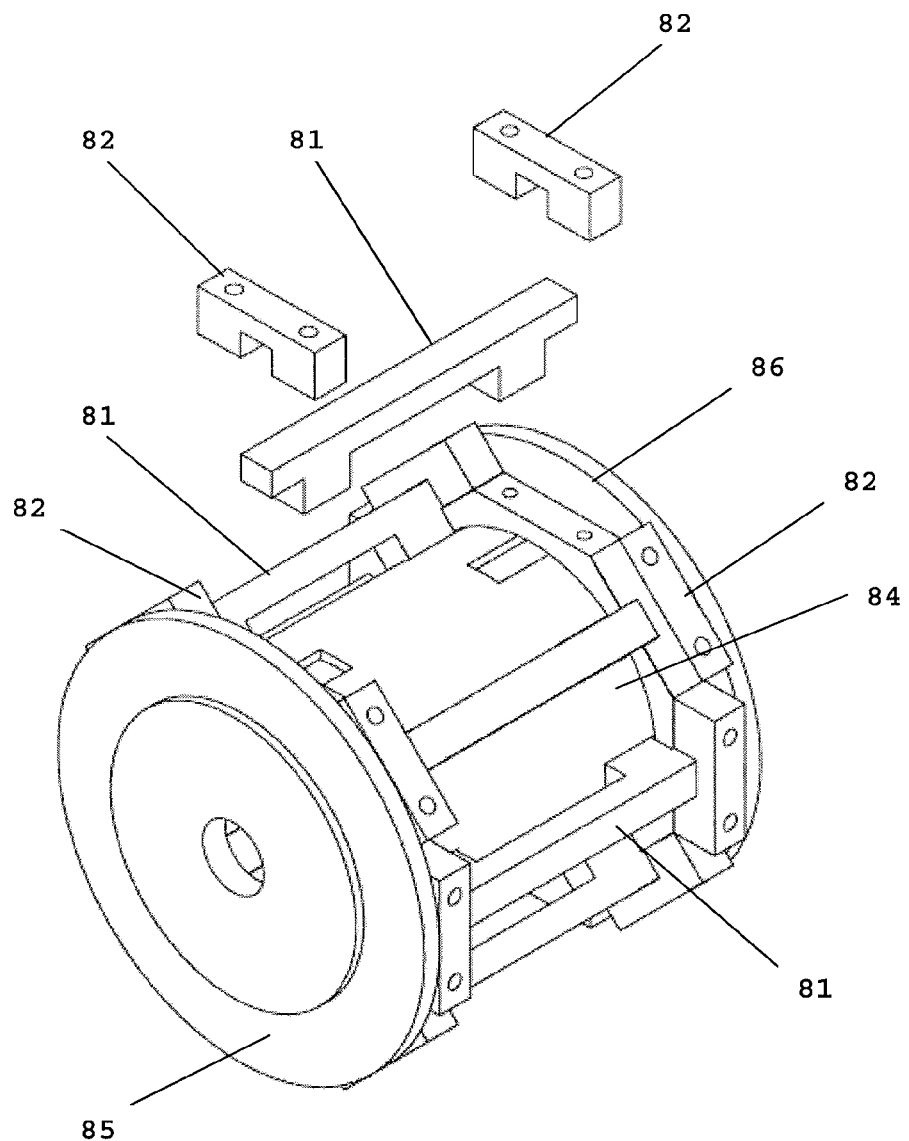

FIG. 8b is a partial assembly of the arrangement shown in FIG. 8a and does not show the rotor which would have been inserted into the assembly before either the forward end cap 85 or rear end cap 86 is added to the assembly.

Figure 9A:
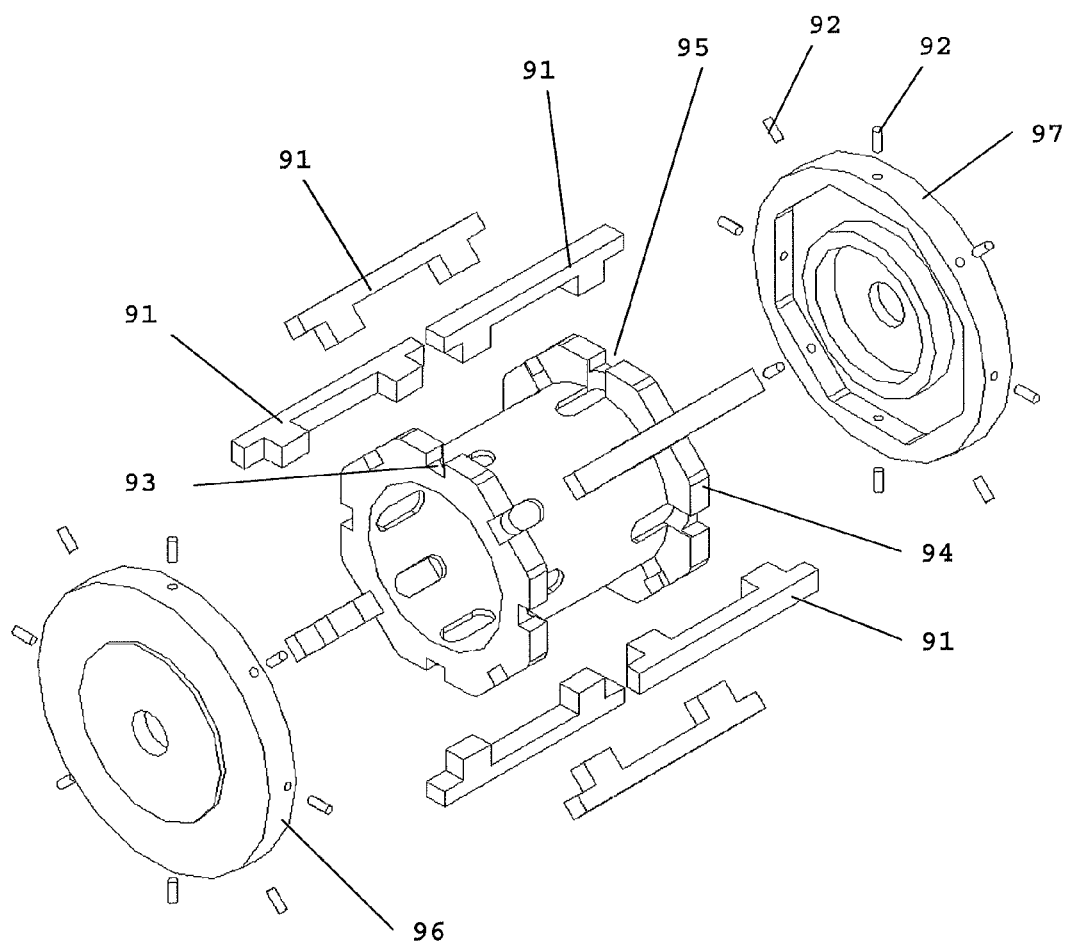
FIG. 9a is an exploded view of another preferred configuration of the stator assembly.

FIG. 9a shows another preferred arrangement of the stator assembly that is comprised of a number of lamination stacks 91, each with an excitation coil (not shown) and integral poles, are clamped and fastened at each end by fasteners or setscrews 92 onto the locating flat 93 that is an integral part of the stator holder 94. The process of machining locating flat 93 will also form slot 95 that will act to constrain or key the lamination stacks 91 to prevent rotational movement when the motor is run. Fasteners or setscrews 92 are threaded into forward end cap 96 and rear end cap 97.

Figure 9B:
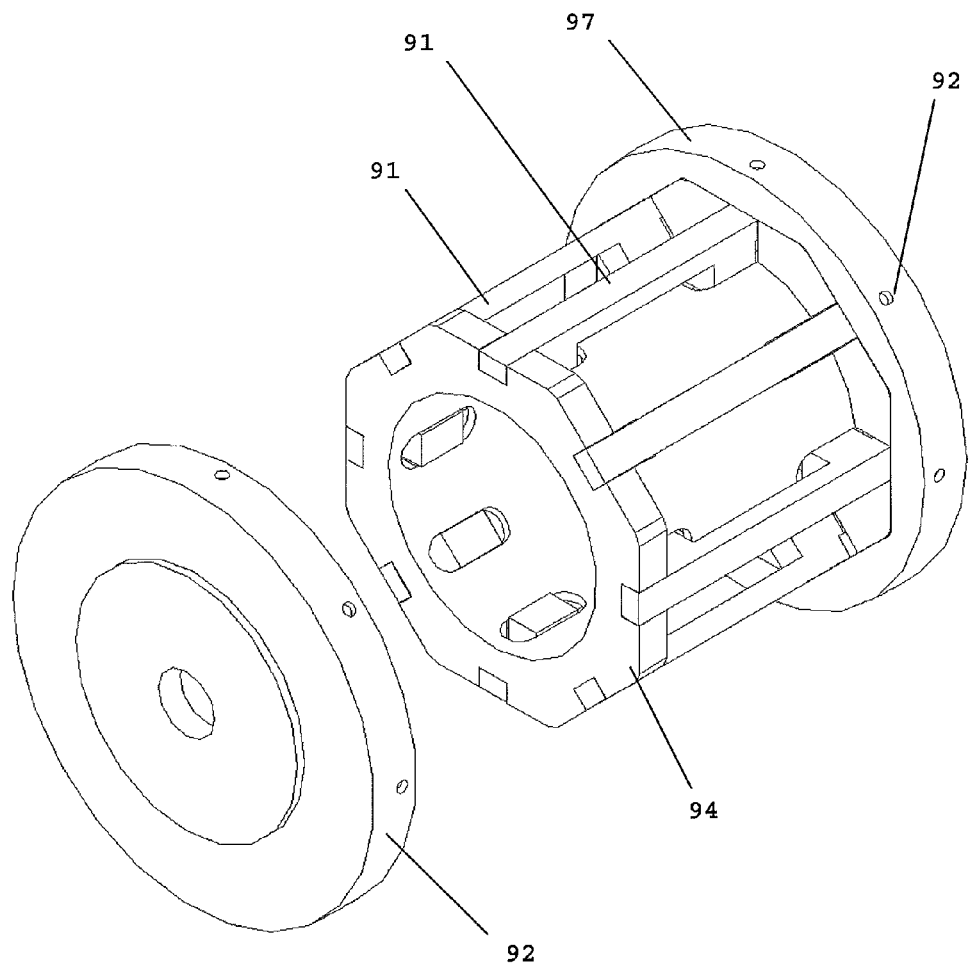

FIG. 9b is a partially assembled view of the arrangement shown in FIG. 9a. The motor's rotor will be inserted into the assembly shown in FIG. 9b before forward end cap 96 is attached to the rest of the assembly.

Figure 10:
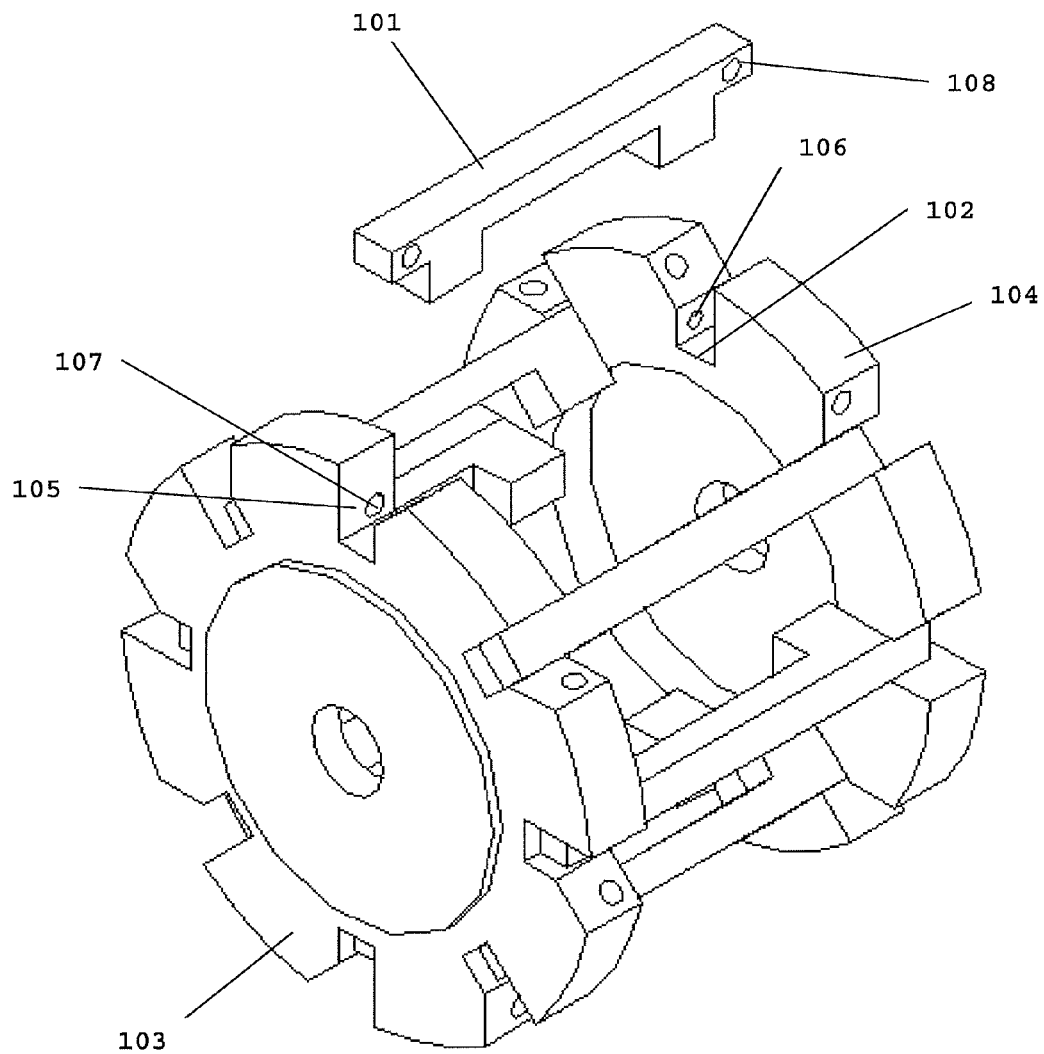
FIG. 10 illustrates a preferred configuration of the stator assembly suited for mass production of the motor.

FIG. 10 is a partially assembled view of another preferred arrangement of the stator in which a number of lamination stacks 101, each with an excitation coil (not shown) and integral poles, are clamped and fastened at each end by fasteners or setscrews (not shown) onto the locating flat 102 that is an integral part of the forward end cap 103 and rear end cap 104. The process of machining locating flat 102 will also form slot 105 that will act to constrain or key the lamination stacks 101 to prevent rotational movement when the motor is run. The fasteners or setscrews are threaded into forward end cap 103 and rear end cap 104 through tapped holes 106 or 107, respectively. When a fastener is used, the lamination stack 101 will have a through-hole 108 at both ends to enable the fastener to better clamp the lamination stack 101 to the end caps. Through-hole 108 may or may not exist when a setscrew is used. Furthermore, this arrangement may or may not include a thin-walled cylinder as depicted in the arrangement shown in FIGS. 8a and 8b. The rotor, not shown in the figure, will be placed into the assembly before either the forward end cap 103 or rear end cap 104 is attached in the final step in the assembly process.

Figure 11:
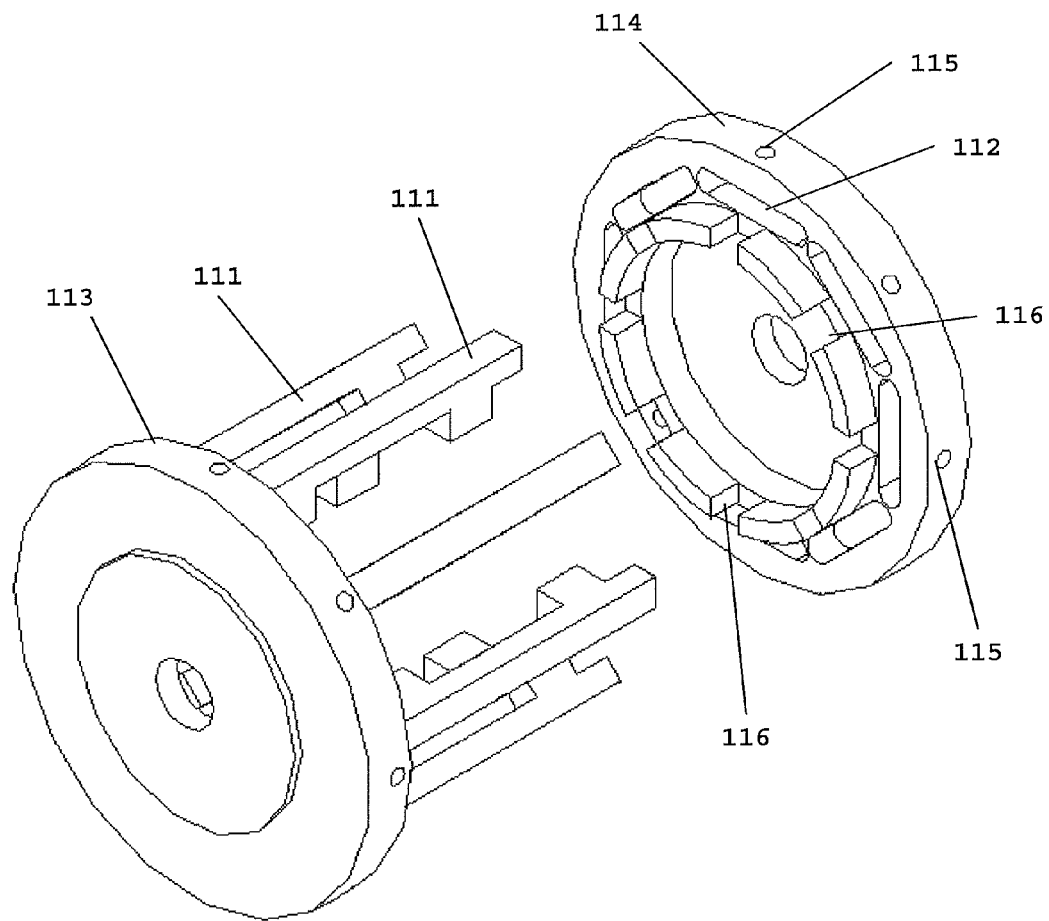
FIG. 11 illustrates another preferred configuration of the stator assembly suited for mass production of the motor.

Yet another preferred arrangement of the invention is shown in FIG. 11 in which a number of lamination stacks 111, each with an excitation coil (not shown) and integral poles, are inserted into, clamped and fastened at each end by fasteners or setscrews (not shown) onto the locating flats or slots 112 that is an integral part of the forward end cap 113 and rear end cap 114. The fasteners or setscrews are threaded into forward end cap 113 and rear end cap 114 through tapped holes 115. Slots 116 on both the forward end cap 113 and rear end cap 114 act to constrain or key the lamination stacks 111 to prevent rotational movement when the motor is run. This arrangement may or may not include a thin-walled cylinder as depicted in the arrangement shown in FIGS. 8a and 8b. The rotor, not shown in the figure, will be placed into the assembly before the rear end cap 114 is attached in the final step in the assembly process.

Figure 12:
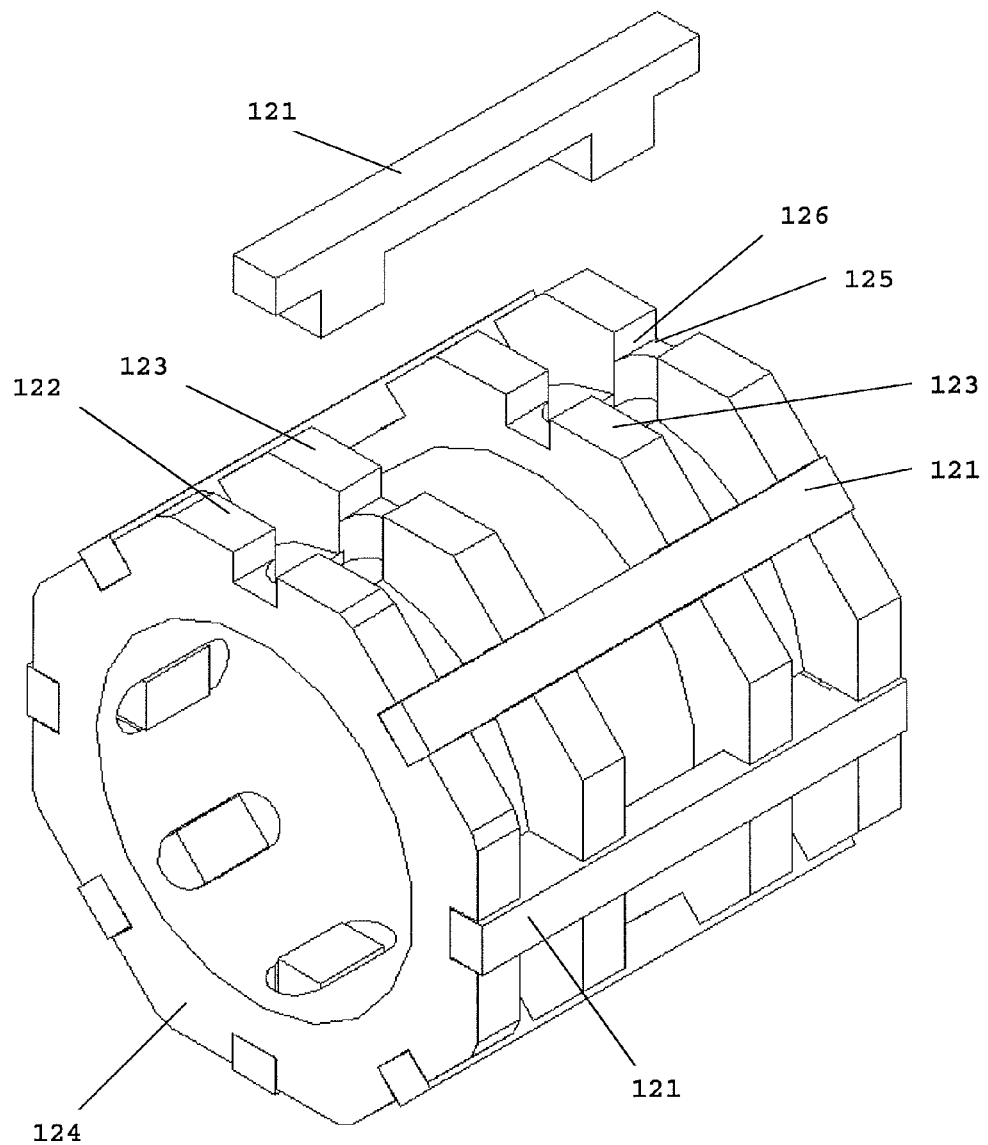
FIG. 12 depicts another preferred configuration of the stator assembly suited to heavy torque or power output.

In the preceding FIGS. 2-11, the stator pole piece/lamination stack is depicted as being supported and clamped or fastened at the extremities of its length in an extension that overhangs the poles. FIG. 12 is a preferred embodiment of the invention in which the stator pole piece/lamination stack 121 is supported on its overhang by the stator holder flange 122 as well as by a second stator holder flange 123 that is located at the extremities of the excitation coil (not shown) onto stator holder 124. The excitation coil, wound around the stator pole piece/lamination stack 121, is thus located between flanges 123 in the stator assembly. The stator pole piece/lamination stack 121 is radially located by surface 125 and keyed by surface 126 to prevent rotational movement during motor operation. Any of the holding, clamping or fastening methods for the stator pole piece/lamination stacks 121 described in prior embodiments can be used in conjunction with this arrangement to form a stator assembly. This embodiment may be particularly useful in the construction of motors with high power or torque outputs.

Figure 13:
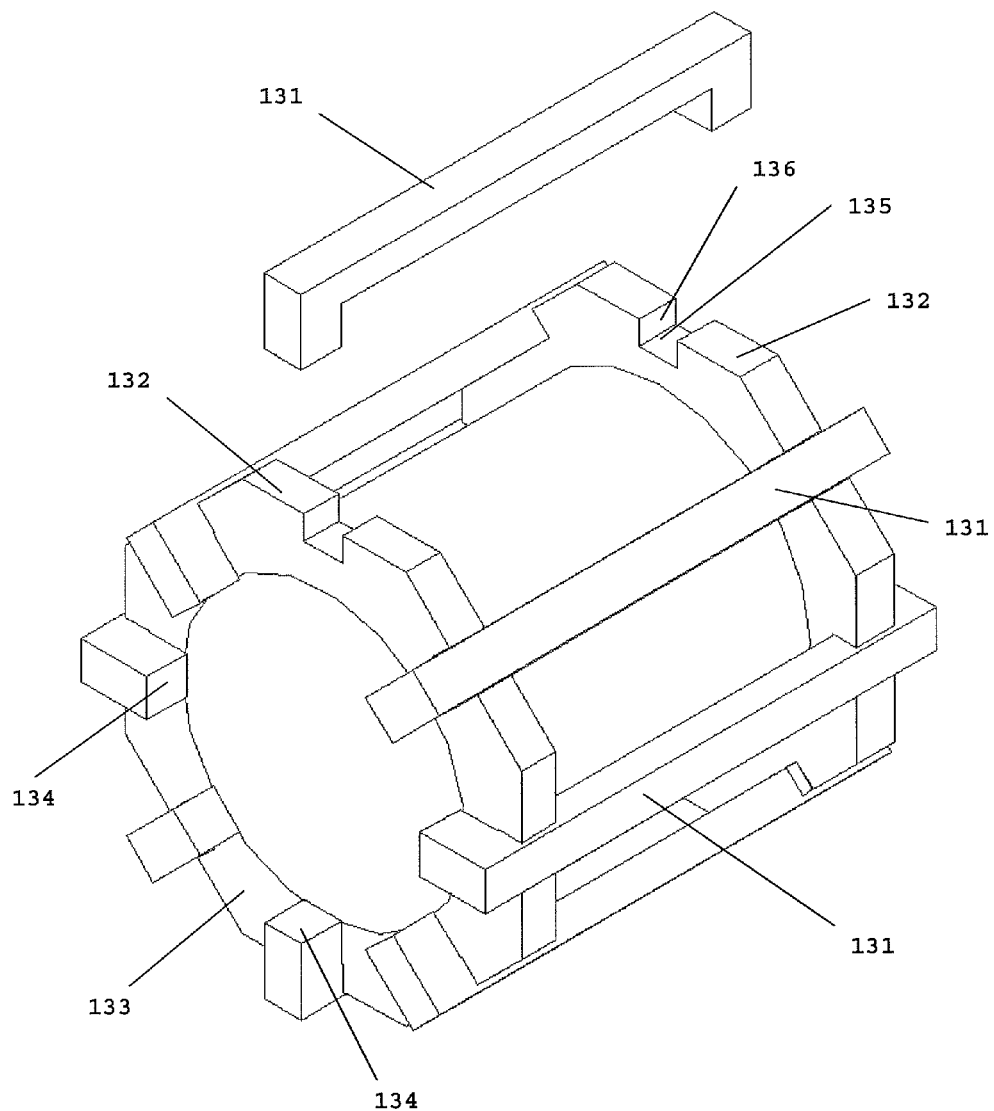
FIG. 13 illustrates another preferred configuration of the stator assembly in which the stator pole pieces/lamination stacks are supported inside of the pole faces.

FIG. 13 depicts another embodiment of the invention in which the stator pole piece/lamination stack 131 is supported on surfaces located at the extremities of the excitation coils (not shown) by stator holder flange 132 onto the stator holder 133. The poles 134 in this embodiment overhang the stator holder 133. The excitation coil, wound around the stator pole piece/lamination stack 131, is thus located between flanges 132 in the stator assembly. The stator pole piece/lamination stack 131 is radially located by surface 135 and keyed by surface 136 to prevent rotational movement during motor operation. Any of the holding, clamping or fastening methods for the stator pole piece/lamination stacks 121 described in prior embodiments can be used in conjunction with this arrangement to form a stator assembly.

While the examples of preferred embodiments of the invention described above relate to SRM motors, it is clear that other motor types (e.g., steppers, brushless) can be made with the same improved stator configuration in accordance with the present invention, and where suitable, the disclosed embodiments for the rotor configuration. It is intended that all modifications and variations that may be devised given the above description of the general principles of the invention be considered as encompassed within the spirit and scope of this invention, as defined in the following claims.

The invention claimed is:

1. An improved configuration for an electric motor comprising:
   an inner rotor rotatable on a longitudinal axis of the motor and provided with a circumferential array of rotor poles facing radially outwardly,
   an outer stator provided with a circumferential array of stator poles excitable by respective stator coils facing radially inwardly toward corresponding rotor poles separated by a thin radial air gap,
   wherein each stator coil is arranged radially outwardly of its respective stator pole and configured to create a magnetic flux path forming a closed magnetic circuit that flows in directions parallel to the longitudinal axis of the motor, rather than circumferentially about the longitudinal axis of the motor, and
   wherein the magnetic flux path extends along a radial length in a radial direction at each rotor pole and then continues along an axial length in an axial direction along the longitudinal axis of the rotor.

2. An improved configuration for an electric motor according to claim 1, wherein each stator segment or lamination stack has a coil of windings wound in a direction transverse to the longitudinal axis of the motor.

3. An improved configuration for an electric motor according to claim 2, wherein the magnetic flux path flows from the stator pole on one end of the pole armature, across the radial air gap a first time, through a rotor pole, across the radial air gap a second time, and back to the stator pole on the opposite end of the pole armature to form a closed magnetic flux path.

4. An improved configuration for an electric motor according to claim 1, formed in an enclosed configuration having a forward end cap, rear end cap, and housing containing stator assembly with a rotor assembly.

5. An improved configuration for an electric motor according to claim 1, formed in an open-frame configuration in which the stator coils are exposed to enable convection cooling or ventilation and access to the stator coil windings for replacement or repair without disassembling the entire motor.

6. An improved configuration for an electric motor comprising:
   an inner rotor rotatable on a longitudinal axis of the motor and provided with a circumferential array of rotor poles facing radially outwardly,
   an outer stator provided with a circumferential array of stator poles excitable by respective stator coils facing radially inwardly toward corresponding rotor poles separated by a thin radial air gap,
   wherein each stator coil is arranged radially outwardly of its respective stator pole and configured to create a magnetic flux path forming a closed magnetic circuit that flows in directions parallel to the longitudinal axis of the motor, rather than circumferentially about the longitudinal axis of the motor, and
   wherein said rotor is formed as a rotor assembly having rotor pole pieces each formed by a lamination stack of rotor laminations with pole faces on two ends of its length that is held by pole holders on opposite sides of a longitudinal slot formed in the rotor assembly.

7. An improved configuration for an electric motor according to claim 1, wherein said rotor is formed as a rotor assembly having a rotor housing formed with enclosed slots for insertion of magnetic material for respective rotor pole pieces.

8. An improved configuration for an electric motor according to claim 1, wherein stator poles are formed on each stator segment or lamination stack with multiple separate segments of stator coil windings.

9. An improved configuration for an electric motor according to claim 8, wherein stator poles are formed with two separate segments of stator coil windings.

10. An improved configuration for an electric motor comprising:
    an inner rotor rotatable on a longitudinal axis of the motor and provided with a circumferential array of rotor poles facing radially outwardly,
    an outer stator provided with a circumferential array of stator poles excitable by respective stator coils facing radially inwardly toward corresponding rotor poles separated by a thin radial air gap,
    wherein each stator coil is arranged radially outwardly of its respective stator pole and configured to create a magnetic flux path forming a closed magnetic circuit that flows in direction parallel to the longitudinal axis of the motor, rather than circumferentially about the longitudinal axis of the motor,
    wherein stator poles are formed on each stator segment or lamination stack with multiple separate segments of stator coils windings,
    wherein stator poles are formed with two separate segments of stator coil windings, and
    wherein said rotor is formed in two distinct half-sections in which a first half-section has a number 'n' of rotor poles, and a second half-section also has a number 'n' of rotor poles that are mechanically offset from the poles of the first half-section by an angle 'a' that is 360 degrees divided by twice the number 'n' of rotor poles.

11. An improved configuration for an electric motor according to claim 1, wherein each rotor pole is comprised of three sections wherein two of the sections on opposite ends of the rotor pole from each other are magnetic and a third section in between the two is non-magnetic.

12. An improved configuration for an electric motor according to claim 1, wherein each rotor pole is comprised of three sections wherein two of the sections on opposite ends of the rotor pole from each other are magnetic and a third section in between the two is made of Somaloy™ alloy.

13. An improved configuration for an electric motor according to claim 1, wherein said stator is formed as a stator assembly comprised of lamination stacks with respective integral stator poles manufactured from sheets of silicon or electrical steel or soft magnetic alloy and joined together.

14. An improved configuration for an electric motor according to claim 1,
    wherein said stator is comprised of lamination stacks with integral poles that are each attached to a non-magnetic stator pole holder that hold the lamination stack onto respective mounting parts of a stator holder.

15. An improved configuration for an electric motor according to claim 14, wherein each pole holder is comprised of a lamination stack holder and two end caps, and a fastener is attached to each end cap to clamp the lamination stack in place on the stator holder.

16. An improved configuration for an electric motor according to claim 1,
    wherein said stator is comprised of a number of lamination stacks with integral poles that are clamped and fastened at each end by fasteners onto locating flats that are integral parts of a stator pole holder, wherein each locating flat forms a slot that will act to constrain the respective lamination stack from rotational movement.

17. An improved configuration for an electric motor according to claim 1,
    wherein said stator is comprised of a number of lamination stacks with integral poles that are clamped and fastened at each end by fasteners onto locating flats that are integral parts of respective forward end and rear end caps, wherein each locating flat forms a slot that will act to constrain the respective lamination stack from rotational movement.

18. An improved configuration for an electric motor according to claim 1,
    wherein said stator is comprised of a number of lamination stacks with integral poles that are inserted into, clamped and fastened at each end by fasteners onto the locating flats that are integral parts of respective forward end and rear end caps, wherein slots formed on both the forward end cap and the rear end cap act to constrain the respective lamination stacks to prevent rotational movement.

19. An improved configuration for an electric motor according to claim 1,
    wherein said stator is comprised of a number of lamination stacks with integral poles that are supported by overhanging ends on respective stator holder flanges on each end, wherein the overhanging ends of the lamination stacks are radially located by slots formed in the stator holder flanges to prevent rotational movement.

20. An improved configuration for an electric motor according to claim 1,
    wherein said stator is comprised of a number of lamination stacks with integral poles at opposite ends thereof that are supported on locating surfaces on respective stator holder flanges, and are radially located by and keyed to slots formed in the stator holder flanges to prevent rotational movement.

* * * * *